UNITED STATES PATENT OFFICE.

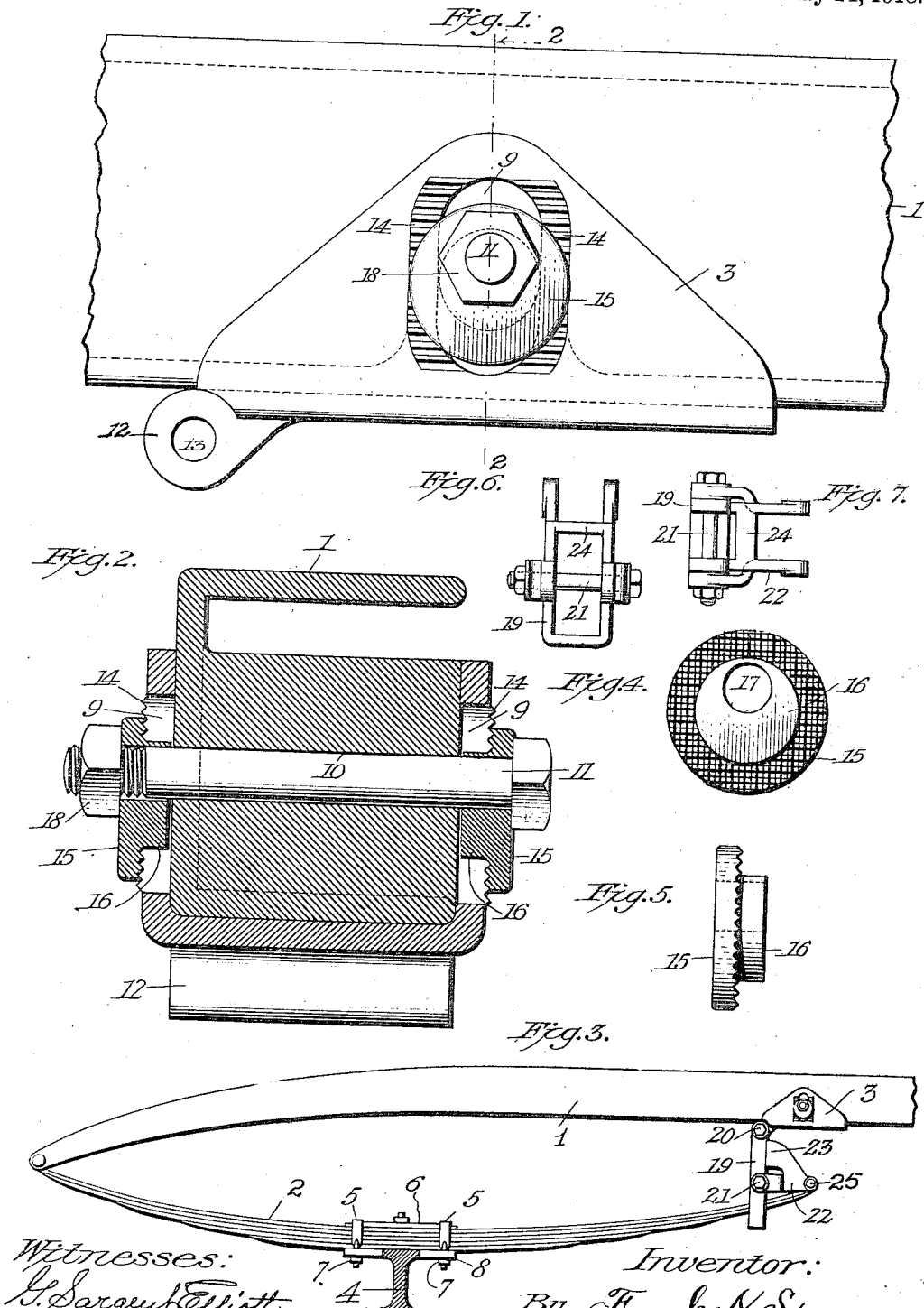

FRANK N. SPRAGUE, OF SEDGWICK, COLORADO.

ADJUSTABLE SHACKLE-SUPPORTING CLIP FOR VEHICLE-SPRINGS.

1,265,825. Specification of Letters Patent. Patented May 14, 1918.

Application filed April 10, 1917, Serial No. 161,067. Renewed March 28, 1918. Serial No. 225,347.

*To all whom it may concern:*

Be it known that I, FRANK N. SPRAGUE, a citizen of the United States of America, residing at Sedgwick, county of Sedgwick, and State of Colorado, have invented a new and useful Adjustable Shackle-Supporting Clip for Vehicle-Springs, of which the following is a specification.

This invention relates to improvements in adjustable-shackle-supporting clips for vehicle springs, and more particularly for the springs of automobiles and the like.

The object of the invention is to provide a clip which may be secured to the side bar of an automobile to facilitate the attachment of any suitable auxiliary device such as shock-absorbing shackle, or one for increasing or diminishing the resiliency of the spring, one end of which is bolted to the clip while the other end is connected to one end of the adjacent cushioning spring of the automobile.

Further, to provide means for facilitating the attachment of an auxiliary device to the side bars of an automobile not otherwise constructed therefor, and to the adjoining end of the side spring, comprising a clip which is adjustably secured to the said side bar by a bolt which passes through the usual bolt hole formed in the side bar at that point, the said clip having a bolt receiving aperture, by which the said auxiliary device may be secured to the clip, the said device being also secured to the adjacent end of the side spring.

These objects are accomplished by the mechanism illustrated in the accompanying drawings, in which:

Figure 1, is a side view of the improved clip, showing the manner of attaching the same to the side bar of an automobile, a portion of the side bar being shown.

Fig. 2, is a transverse vertical sectional view on the line 2—2 of Fig. 1.

Fig. 3, is a side view of a side bar and spring, one end of said spring being secured to a shock absorbing shackle, which is also secured to the improved clip, which clip is secured to the said side bar.

Fig. 4, is a side view of one of the eccentric washers through which the clip-securing bolt passes.

Fig. 5, is an edge view of the said washer.

Fig. 6, is a front view of the shackle shown in Fig. 3. And

Fig. 7, is a top view of the same.

Similar letters of reference refer to similar parts throughout the several views.

The improved clip to be hereinafter described, is adapted primarily to facilitate the attachment to the side bars of an automobile, of shackles which are also adapted to be connected to the adjacent ends of the side springs, and which are for the purpose of increasing or diminishing the resiliency of the said springs to meet the demands of varying road and load conditions, such a shackle being embodied in a U. S. patent which was granted to me on the 11th day of July, 1916, No. 1,190,966.

These shackles, in order to carry out their function, must be connected to the side bars at points substantially three inches forward of the inner ends of the side springs, as will be understood by reference to Fig. 3; and as the bolts which ordinarily secure these ends of the springs, pass through bolt holes in the side bars which are substantially in vertical line with the ends of the springs, it will be apparent that either additional bolt holes must be made in the side bars the required distance forward of those already formed, or an attaching means must be provided which can be secured by a bolt which passes through the hole already formed in the side bar, and to which the vertical member of the shackle may be pivotally secured, the other member of the shackle being secured to the adjacent end of the spring. Such an attaching means is embodied in the form of clip illustrated in the accompanying drawings, in which:

The numeral 1 indicates the side bar of the frame of an automobile, to the forward end of which is secured, in the usual manner, one end of an ordinary semi-elliptical spring 2, the other end of which is connected by a suitable shackle, to the improved clip 3, which is bolted to the side bar 1, in a manner to be presently described. The spring is connected to the forward axle 4 by U-clips 5, which rest upon the end portion of a plate 6, which rests upon the top leaf of the spring, the threaded ends of the clips 5 being secured by nuts 7, to horizontal plates 8, which form an integral part of the axle.

The clip embodied in this application is primarily intended as a securing means for one member of the shackle set forth in the patent above referred to. Therefore a brief description of this shackle is deemed essential in order that the function of the improved clip may be readily understood, and will hereinafter be given. The clip 3 comprises a channel form of casting, which is of a size to fit closely around side bar, as clearly shown by Fig. 2, and the opposite sides of the clip are provided with vertical slots 9, which in width are about twice the diameter of the usual bolt hole 10, in the side bar, through which passes the usual bolt which attaches the rear end of the side spring to the side bar, and it is through this hole 10 that the attaching bolt 11 for the clip passes. The forward end of the bottom plate of the clip terminates in a lug 12, having a bolt hole 13 to be hereinafter mentioned.

The outer faces of the sides of the clip adjoining the sides of the slots 9, are provided with teeth or serrations 14, which extend a suitable distance beyond the sides of the slots.

In securing the clips to the side bars, I employ a pair of washers 15, for each clip, and each washer comprises a circular metal disk, having an integral circular concentric boss 16, the diameter of which is the same as the width of the slot 9, and these washers are placed against the opposite sides of the clip, with their bosses extending into the respective slots 9. A bolt hole 17 extends through each washer and its boss, and is eccentric to the axis of the washer, the axial center of the bolt hole being so far to one side of the axial center of the boss that the margin of the said bolt hole extends through the axial center of the boss, as will appear by reference to Fig. 4.

The bolt 11 passes through the holes 17 of the washer and through the hole 10 of the side bar, and is provided with a clamping nut 18 by which the two washers are clamped tightly against the respective sides of the clip. By turning the washers 15 on the bolt 11, either to the right or left of the position shown in Fig. 1, the axial center of the washer and of the boss is shifted; and therefore the position of the boss is likewise shifted either to the right or left of the axial center of the bolt 11, and this shifting of the boss permits an adjustment of the clip 3 to the right or left, a sufficient distance to properly position the bolt hole 13 in its lug 12, with respect to the shackle. In the present instance, the boss is 14/16 of an inch in diameter, and the bolt 7/16 of an inch in diameter; therefore the distance between the extreme points of adjustment would be 7/16 of an inch.

The inner faces of the washers 15, which bear against the serrated portions of the clip, are also serrated, as shown by Fig. 4, so that when the washers are turned to properly adjust the clip and clamped by the nut 18 on the bolt 11, the serrated faces of the clip and of the washers will prevent the said washers from turning.

Thus the clips may be adjusted either to the right or left to counteract slight variations in the position of the bolt hole 10 in the side bar, and the slots 9 in the clip allow for variations in a vertical line of the position of the said hole.

The shackle illustrated, comprises a main yoke-shaped hanger 19, the free ends of which are provided with bolt holes, and this hanger is secured to the lug 12 of the clip by a bolt 20, which passes through the hole 13, in the said lug and through the holes in the hanger, as will be understood by reference to Fig. 3, thus permitting a swinging movement of the hanger with respect to the lug 12.

A bolt 21 passes through the sides of the hanger slightly below the center of its length, and upon this bolt is mounted the spring-end-receiving member 22 of the shackle. The member 22 comprises parallel side members, which for a part of their length are the same distance apart as the side members of the hanger, but their inner ends are spread as shown to lie against the outside faces of the sides of the hanger, and these ends have holes for the reception of the bolt 21, by which a hinge connection is formed between the hanger and the member 22.

The sides of the member 22 have upwardly extending abutment lugs 23, which normally bear against the adjacent edges of the sides of the hanger, and these abutments are connected by an integral bar 24. A bolt 25 passes through the outer ends of the member 22, and this bolt supports the inner end of the upper leaf of the spring 2, the said spring end being rolled in the usual manner, to form an eye through which the bolt passes. This shackle is adapted to automatically control the resiliency of the spring, as fully set forth in the patent above referred to, and as it forms no part of the present invention, a further description of it is deemed unnecessary, the said shackle being shown only to give function to the clip.

The clip above described, permits the attachment of the shackle without the necessity of forming an additional hole in the side bar, and the adjustable feature of the clip provides for slight variations in the position of the hole in the side bar, so that the shackle can be accurately attached.

Having thus described my invention, what I claim as new and desire to secure by Letters Patent, is:

1. The combination with the side bar of a vehicle, the axle, a leaf spring secured midway of its length to said axle and at one end to said side bar, and a two part shackle one member of which is secured to the other end of the spring, of means for securing the other member of the shackle, comprising a clip having an apertured lug, means for connecting the said other member of the shackle to said lug, and means for adjustably securing said clip to the said side bar.

2. The combination with the side bar of a vehicle, the spring, and an attachment on one end of the spring, of a clip adjustably secured upon said side bar, and means for connecting said attachment to said clip.

3. The combination with the side bar of a vehicle, of a clip for the purpose specified, comprising a channel form of casting having an apertured lug at one end, and means for adjustably securing said clip to said side bar.

4. The combination with the side bar of a vehicle, of a clip for the purpose specified, comprising a channel form of casting having a bolt-receiving aperture at one end, a bolt extending through said side bar and clip, eccentrically mounted members on said bolt in bearing contact with said clip for effecting lateral adjustments of the same, and means for securing said eccentrically mounted members in adjusted positions.

5. The combination with a fixed object of a clip for the purpose specified, comprising a channel form of casting having slots in its sides and an apertured lug at one end, washers having circular bosses which enter said slots, and apertures which extend through said washers eccentric to their axial centers, a bolt extending through an aperture in said fixed object and through the apertures in said washers, and a clamping nut on the end of said bolt.

6. A clip of the character described, comprising a channel form of casting having vertical slots in its opposite sides, one end of its base being formed with a lug having a bolt-receiving aperture, washers having circular concentric bosses which enter said slots, and having bolt holes eccentric with respect to the axes of the bosses, and a bolt extending through said washers having a clamping nut on its threaded end, whereby said clip may be adjustably secured to an object.

7. A clip of the character described, comprising a channel form of casting having vertical slots in its opposite sides, one end of its base portion being formed with a lug having a bolt receiving aperture, washers having circular concentric bosses which enter said slots, and having bolt holes eccentrically positioned with respect to the axes of the bosses, the portions of said clip adjoining said slots being serrated and the clip-engaging faces of said washers being also serrated, and a bolt which passes through the holes in said washers and is provided with a clamping nut on its threaded end, whereby said clip may be adjustably secured to an object.

8. The combination with a vehicle axle, a side bar, and a spring secured midway of its length to said axle, and at one end to the end of said side bar, of a channel clip on said side bar having an apertured lug on one end, and vertical slots in its opposite sides, washers on opposite sides of said clip having concentric circular bosses which enter said slots, and bolt holes eccentrically positioned with respect to the axes of the bosses, a bolt extending through an aperture in said side bar and said washers and having a clamping nut on its outer end, the meeting faces of said clip and said washers being serrated, and a shackle for automatically controlling the resiliency of said spring, which is pivotally connected to the lug on said clip and to the other end of said spring.

In testimony whereof I affix my signature in presence of two witnesses.

FRANK N. SPRAGUE.

Witnesses:
  H. E. McKINSTRY,
  L. C. PEYTON.

Copies of this patent may be obtained for five cents each, by addressing the "Commissioner of Patents, Washington, D. C."